2,949,461

CERTAIN α-PHENYL-IMINO-3-PHENYL-THIAZOLINES

Renat Herbert Mizzoni, Long Valley, N.J., assignor to Ciba Pharmaceutical Products, Inc., Summit, N.J., a corporation of New Jersey No Drawing. Filed Jan. 26, 1959, Ser. No. 788,757

11 Claims. (Cl. 260—240)

The present invention relates to 4-lower alkyl-thiazolines. More particularly, the invention concerns 2-phenyl-imino-3-phenyl-4-lower alkyl-4-thiazolines, in which one of the phenyl radicals contains in the 4-position a group of the formula Py—$[C(R)=CH]_n$—, in which Py stands for a pyridyl group, R represents hydrogen, lower alkyl or monocyclic carbocyclic aryl, and $n$ represents a whole number from 0 to 2, and the other phenyl group contains in the 4-position an N,N-di-lower alkyl-amino-lower alkoxy group, or particularly an alkoxy group having from 4 to 5 carbon atoms, the salts thereof and mixtures of such compounds, as well as process for the preparation thereof.

A pyridyl radical is represented by 3-pyridyl, 4-pyridyl, or especially by 2-pyridyl radicals, which radicals are preferably unsubstituted, or may contain as additional substituents lower alkyl, e.g. methyl or ethyl; nitro or amino groups, or halogen atoms, e.g. chlorine or bromine. R stands primarily for hydrogen; it may also represent lower alkyl, e.g. methyl or ethyl. Furthermore, a monocyclic carbocylic aryl radical, e.g. phenyl or phenyl substituted by halogen, e.g. chlorine or bromine, or by lower alkoxy, e.g. methoxy or ethoxy, may be anticipated as a radical R.

An N,N-di-lower alkyl-amino-lower alkoxy group is represented by 2-dimethylaminoethoxy or 2-diethylaminoethoxy. An alkoxy group having from 4 to 5 carbon atoms is represented by n-butyloxy, isobutyloxy, secondary butyloxy, n-pentyloxy or isopentyloxy.

The lower alkyl group in the 4-position of the 4-thiazoline nucleus is represented by ethyl, or particularly by methyl.

Salts of the new compounds of this invention are therapeutically acceptable acid addition salts, for example, those with inorganic acids, such as hydrochloric, hydrobromic, sulfuric or phosphoric acids; or those with organic acids, such as acetic, propionic, glycolic, latic, oxalic, malonic, maleic, fumaric, malic, benzoic, salicylic, 4-aminosaliscylic, methane sulfonic, ethane sulfonic or hydroxyethane sulfonic acid. Mono- or poly-salts may be formed.

The new compounds, salts thereof and mixtures of these componnds are active against different types of Mycobacteria, such as *Mycobacterium tuberculosis*, for example, the human pathogenic strain H 37 Rv of *Mycobacterium tuberculosis*, or against *Mycobacterium leprae*, and may be used as antitubercular or antileprotic agents. For example, a good tuberculostatic activity may be obtained with 2-phenyl-imino-3-phenyl-4-methyl-4-thiazoline derivatives, in which one of the phenyl radicals contains in the 4-position an alkoxy group having from 4 to 5 carbon atoms, and the other phenyl radical contains in the 4-position a 2-pyridyl or a 2-(2-pyridyl)-ethenyl group.

The new compounds may be used as medicaments in the form of pharmaceutical preparations, which contain the new compounds, salts thereof or mixtures of these compounds in admixture with a pharmaceutical organic or inorganic, solid or liquid carrier suitable for enteral, e.g. oral, or parenteral administration. For making up the preparations there may be employed substances which do not react with the new compounds, such as water, gelatine, lactose, starches, stearic acid, magnesium stearate, stearyl alcohol, talc, vegetable oils, benzyl alcohols, gums, waxes, propylene glycol, polyalkylene glycols or any other known carrier for medicaments. The pharmaceutical preparations may be in solid form, for example, as tablets, capsules or dragees, or in liquid form, for example, as solutions, suspensions or emulsions. If desired they may contain auxiliary substances, such as preserving agents, stabilizing agents, wetting or emulsifying agents, salts for varying the osmotic pressure or buffers. They may also contain, in combination, other therapeutically useful substances, particularly other tuberculostatic reagents, such as streptomycin, dihydrostreptomycin, 4-aminosalicylic acid or isonicotinic acid hydrazide, or other leprostatic compounds, such as sulfones, e.g. thiazolsulfone.

The new 4-thiazoline derivatives of this invention, the salts or mixtures of such compounds may be prepared, for example, by reacting a 1,3-diphenyl-2-thiourea, in which one of the phenyl radicals contains in the 4-position a group of the formula Py—$[C(R)=CH]_n$—, in which P, R and $n$ have the above-given meaning, and the other phenyl group contains in the 4-position an N,N-di-lower alkyl-amino-lower alkoxy group or a lower alkoxy group having from 4 to 5 carbon atoms, or a salt thereof with a methyl lower alkyl ketone, in which the methyl group contains a halogen atom, and, if desired, converting a resulting salt into a free base, and/or, if desired, converting a free base into a salt thereof, and/or, if desired, separating a resulting mixture into the single compounds.

Methyl lower alkyl ketones, in which the methyl group is substituted by a halogen atom, e.g. chlorine, bromine or iodine, may be represented, for example, by monochloroacetone, monobromoacetone or monobromomethyl ethyl ketone.

The reaction is preferably conducted in the presence of a solvent, for example, a lower alkanol, e.g. methanol or ethanol; an aromatic hydrocarbon, e.g. benzene or toluene; or a lower carboxylic acid in the presence of an alkali metal salt of such acid, for example, acetic acid, e.g. glacial acetic acid in the presence of sodium acetate. If desired, the reaction may be completed more rapidly by refluxing the mixture up to 6 hours. Any unreacted thiourea which contaminates the final product, may be identified by infrared studies or by forming an insoluble black precipitate upon addition of lead acetate to an alcoholic solution of the product. If necessary, the reaction may be completed by reacting the product containing any unreacted thiourea with an additional amount of the halogenated ketone.

The starting materials used in this reaction are known or may be prepared according to known methods for the manufacture of 1,3-diphenyl-2-thiourea such as reacting an appropriately substituted phenylisothiocyanate with a substituted aniline; for example, 4-isopentyloxyphenylisothiocyanate may be reacted with 4-(2-pyridyl)-aniline or 4-[2-(2-pyridyl)ethenyl]-aniline to form the desired 1-(4-isopentyloxy-phenyl)-3-[4-(2-pyridyl)-phenyl]-2-thiourea and 1-(4-isopentyloxy-phenyl)-3-{4-[2-(2-pyridyl)-ethenyl]-phenyl}-2-thiourea, respectively. These thioureas may also be used in the form of their acid addition salts.

The new 4-thiazoline compounds of this invention may be obtained in the form of a mixture of two isomeric compounds, which may be separated into the two single compounds by ordinary methods, such as fractionated crystallization, adsorption and fractionated elution, etc. However, the resulting mixture may also be used as such.

Depending on the conditions used the new compounds may be obtained in the form of the free bases or salts thereof. A salt may be converted into the free base in the customary way, for example, by treatment with an aqueous alkaline medium, such as an alkali metal hydroxide, e.g. sodium or potassium hydroxide; an alkali metal carbonate, e.g. sodium carbonate or potassium hydrogen carbonate; or ammonia. A free base may be transformed into its therapeutically acceptable acid addition salts by reaction with one of the acids outlined above, for example, in a lower alkanol, e.g. methanol, ethanol, propanol or isopropanol, solution. The compounds may also be obtained in the form of hydrates and mono- or poly-salts may be formed.

This is a continuation-in-part application of my application Serial No. 776,752, filed November 28, 1958 (now abandoned), which in turn is a continuation-in-part application of my application Serial No. 714,969, filed February 13, 1958 (now abandoned).

The following examples are intended to illustrate the invention and are not to be construed as being limitations thereon. Temperatures are given in degree centigrade.

*Example 1*

A mixture of 4.5 g. of 1-(4-isobutyloxy-phenyl)-3-[4-(2-pyridyl)-phenyl]-2-thiourea and 1.15 g. of chloroacetone in 100 ml. of anhydrous ethanol is refluxed for 4½ hours. The solvent is removed under reduced pressure, ether is added and the separated oil solidifies after repeated trituration with fresh portions of ether. A solution of the precipitate, representing a mixture of the 2 - (4 - isobutyloxy - phenyl) - imino - 3 - [4 - (2-pyridyl) - phenyl] - 4 - methyl-4-thiazoline hydrochloride and the 2-[4-(2-pyridyl)-phenyl]-imino-3-(4-isobutyloxy-phenyl)-4-methyl-4-thiazoline hydrochloride, is poured into a large volume of ether while stirring and the solid material is filtered off, washed with ether and dried under reduced pressure. The mixture melts at 144–158° and analyzes for the mono-hydrate of the dihydrochloride salt.

*Example 2*

A solution of 39.1 g. of 1-(4-isopentyloxy-phenyl)-3-[4-(2-pyridyl)-phenyl]-2-thiourea and 9.7 g. of chloroacetone in 300 ml. of ethanol is treated as described in Example 1; the mixture of 2-(4-isopentyloxy-phenyl)-imino-3-[4-(2-pyridyl)-phenyl]-4-methyl-4-thiazoline and 2 - [4 - (2 - pyridyl) - phenyl] - imino - 3 - (4 - isopentyloxy-phenyl)-4-methyl-4-thiazoline hydrochlorides may be obtained and separated by fractionated crystallization.

The starting material used in the above reaction may be prepared as follows: A solution of 3.4 g. of 4-(2-pyridyl)-aniline and 4.4 g. of 4-isopentyloxy-phenylisothiocyanate in 15 ml. of methanol is refluxed for fifteen minutes. The white precipitate, formed upon chilling, is filtered off and washed with ether. A second crop of crystalline material is obtained by diluting the filtrate with ether. The combined crops are dissolved in chloroform, the solution filtered through silicic acid and the filtrate diluted with pentane. The crystalline 1-(4-isopentyloxy - phenyl) - 3 - [4 - (2 - pyridyl) - phenyl]-2-thiourea is filtered off, washed with pentane and dried, M.P. 128–128.5°; yield: 2.9 g.

*Example 3*

A mixture of 2-(4-n-butyloxy-phenyl)-imino-3-[4-(3-pyridyl)-phenyl]-4-methyl-4-thiazoline hydrochloride and 2 - [4 - (3 - pyridyl) - phenyl] - imino - 3 - (4 - n - butyloxy-phenyl)-4-methyl-4-thiazoline hydrochloride is obtained by reacting a mixture of 37.7 g. of 1-(4-n-butyloxy-phenyl) - 3 - [4 - (3 - pyridyl) - phenyl] - 2 - thiourea and 9.7 g. of chloroacetone in 300 ml. of ethanol according to the procedure of Example 1.

*Example 4*

A mixture of 38.8 g. of 1-(4-n-butyloxy-phenyl)-3-{4 - [2 - (2 - pyridyl) - ethenyl] - phenyl} - 2 - thiourea and 9.8 g. of chloroacetone in 300 ml. of anhydrous ethanol is refluxed for three hours. The hot solution is filtered, chilled and then diluted with ether. The precipitate is filtered off and recrystallized twice from a mixture of ethanol and ether to yield a mixture of the 2 - (4 - n - butyloxy - phenyl) - imino - 3 - {4 - [2 - (2-pyridyl) - ethenyl] - phenyl} - 4 - methyl - 4 - thiazoline hydrochloride and the 2-{4-[2-(2-pyridyl)-ethenyl]-phenyl} - imino - 3 - (4 - n - butyloxy - phenyl) - 4-methyl-4-thiazoline hydrochloride, which may be separated by fractionated crystallization.

The starting material may be prepared as follows: A mixture of 7.9 g. of 4-[2-(2-pyridyl)-ethenyl]-aniline and 10.4 g. of 4-n-butyloxy-phenylisothiocyanate in 120 ml. of methanol is refluxed on the steam bath. A yellow precipitate forms after 5 minutes, and the reaction mixture is cooled after an additional two hours of refluxing. The solid material is filtered off and the 1-(4-n-butyloxyphenyl) - 3 - {4 - [2 - (2 - pyridyl) - ethenyl] - phenyl} 2-thiourea hemihydrate is recrystallized from anhydrous ethanol, M.P. 168-169°; yield: 11.0 g.

*Example 5*

A mixture of 40.2 g. of 1-(4-isopentyloxy-phenyl)-3-{4-[2-(2-pyridyl)-ethenyl]-phenyl}-2-thiourea and 9.8 g. of chloroacetone in 400 ml. of ethanol is treated as described in Example 1; the mixture of 2-(4-isopentyloxyphenyl) - imino - 3 - {4 - [2 - pyridyl) - ethenyl]-phenyl}-4-methyl-4-thiazoline hydrochloride and 2-{4-[2 - (2 - pyridyl) - ethenyl] - phenyl} - imino - 3 - (4-isopentyloxy-phenyl)-4-methyl-4-thiazoline hydrochloride may be obtained and separated as shown in Example 4.

The resulting hydrochloride may be converted to the free base by treatment with aqueous ammonia. From the free base other salts can be prepared with acids, such as sulfuric acid.

The starting material may be prepared as follows: A solution of 7.9 g. of 4-[2-(2-pyridyl)-ethenyl]-aniline and 8.9 g. of 4-isopentyloxy-phenylisothiocyanate in a mixture of 20 ml. of methanol and 50 ml. of ethanol is refluxed on the steam bath for 3½ hours. The white precipitate, formed upon chilling, is filtered off and recrystallized from a mixture of isopropanol and ethanol to yield 6 g. of 1-(4-isopentyloxy-phenyl)-3-{4-[2-(2-pyridyl)-ethenyl]-phenyl}-2-thiourea, M.P. 143.5–146°.

*Example 6*

A mixture of 2-(4-isobutyloxy-phenyl)-imino-3-{4-[2-(2-pyridyl) - ethenyl] - phenyl} - 4 - methyl - 4-thiazoline hydrochloride and 2 - {4 - [ 2 - (2 - pyridyl)-ethenyl]- phenyl} - imino - 3 - (4 - isobutyloxyphenyl)-4-methyl-4-thiazoline hydrochloride is obtained by reacting a mixture of 19.5 g. of 1-(4-n-butyloxyphenyl)-3-{4-[2-(2-pyridyl)-ethenyl]-phenyl}-2-thiourea and 5.0 g. of chloroacetone in 150 ml. of ethanol according to the procedure of Example 5.

The starting material may be prepared as follows: 7.9 g. of 4-[2-(2-pyridyl)-ethenyl]-aniline is dissolved in a mixture of 120 ml. of methanol and 75 ml. of ethanol, 10.5 g. of 4-isobutyloxy-phenylisothiocyanate is added to the warm solution, and the mixture is refluxed for three hours on the steam bath. The solution is concentrated to one-third of its orginal volume, the precipitate is filtered off after chilling and is washed with isopropanol. The resulting 1-(4-isobutyloxy-phenyl)-3-{4-[2-(2-pyridyl)-ethenyl]-phenyl}-2-thiourea is recrystallized from aqueous methanol, M.P. 139°.

By reacting the 1-[4-(2-diethylaminoethoxy)-phenyl]-3-[4-(4-pyridyl)-phenyl]-2-thiourea, prepared by treating 4-(2-diethylaminoethoxy)-phenylisothiocyanate with 4-(4-pyridyl)-aniline in methanol, with chloroacetone according to the process given in Example 1, a mixture of 2-[4-

(4-pyridyl)-phenyl]-imino-3-[4-(2 - diethylaminoethoxy)-phenyl]-4-methyl-4-thiazoline hydrochloride and 2-[4-(2-diethylaminoethoxy)-phenyl]-imino-3-[4 - (4 - pyridyl)-phenyl]-4-methyl-4-thiazoline hydrochloride can be obtained, which may be separated into its constituents by fractionated crystallization. 4-[4-(2-pyridyl)-butadienyl]-aniline may be reacted with 4-n-butyloxy-phenyl-isothiocyanate to give the 1-{4-[4-(2-pyridyl)-butadienyl]-phenyl}-3-(4-n-butyloxy-phenyl)-2-thiourea, which, when reacted with chloroacetone, yields a mixture of 2-{4-[4-(2-pyridyl)-butadienyl]-phenyl}-imino-3-(4-n - butyloxy-phenyl)-4-methyl-4-thiazoline hydrochloride and 2-(4-n-butyloxy-phenyl)-imino-3-{4-[4-(2-pyridyl) - butadienyl]}-4-methyl-4-thiazoline hydrochloride.

Example 7

By reacting 1-(4-isopentyloxy-phenyl)-3-{4-[2-methyl-2-(2-pyridyl)-ethenyl]-phenyl}-2-thiourea with chloroacetone in ethanol a mixture of 2-(4-isopentyloxy-phenyl)-imino-3-{4-[2-methyl-2-(2-pyridyl)-ethenyl]-phenyl} - 4-methyl-4-thiazoline hydrochloride and 2-{4-[2-methyl-2-(2-pyridyl)-ethenyl]-phenyl}-imino-3 - (4 - isopentyloxy-phenyl)-4-methyl-4-thiazoline hydrochloride is formed, which can be separated into the single compounds by fractionated crystallization.

The starting material used in the above reaction may be prepared as follows: A mixture of 53.5 g. of 2-ethyl-pyridine, 75.6 g. of p-nitrobenzaldehyde and 52 g. of acetic acid anhydride is refluxed for seven hours. The cold mixture is poured into dilute aqueous hydrochloric acid, and made slightly basic with aqueous ammonia while stirring. The yellow 4-[2-methyl-2-(2-pyridyl)-ethenyl]-nitrobenzene is filtered off, washed, air dried and recrystallized from 95 percent ethanol, M.P. 98–100.5°; yield: 84 percent.

To a solution of 343 g. of stannous chloride in 535 ml. of concentrated aqueous hydrochloric acid is added 101 g. of 4-[2-methyl-2-(2-pyridyl)-ethenyl]-nitrobenzene; a light colored paste is formed and heating is continued for one and one-half hours. The mixture is chilled, filtered, the solid material is washed and added to concentrated aqueous hydrochloric acid. The resulting suspension is poured into aqueous sodium hydroxide, so that the final pH=10–11, and the precipitate is filtered off, washed thoroughly with water and dried on the funnel. The solid material is extracted with ethanol in a soxhlet apparatus, the solvent is evaporated and the light tan-colored 4-[2-methyl-2-(2-pyridyl)-ethenyl]-aniline is recrystallized from isopropanol, M.P. 118.5°; yield. 43 g.

A solution of 11.1 g. of 4-isopentyloxy-phenylisothiocyanate and 10.5 g. of 4-[2-methyl-2-(2-pyridyl)-ethenyl]-aniline in 100 ml. of anhydrous ethanol is refluxed for three hours, then filtered hot and the filtrate is chilled. The resulting 1-(4-isopentyloxy-phenyl)-3-{4-[2-methyl-2-(2-pyridyl)-ethenyl]-phenyl}-2-thiourea is filtered off, washed with a 1:1-mixture of ethanol and petroleum ether and recrystallized from isopropanol, M.P. 124.5–125.5°; yield: 15 g.

Example 8

A mixture of 2-(4-isobutyloxy-phenyl)-imino-3-{4-[2-methyl-2-(2-pyridyl)-ethenyl]-phenyl}-4-methyl - 4 - thiazoline hydrochloride and 2-{4-[2-methyl-2-(2-pyridyl)-ethenyl]-phenyl}-imino-3-(4 - isobutyloxy - phenyl) - 4-methyl-4-thiazoline hydrochloride, which may be separated into the single components by fractionated crystallization, may be obtained by reacting 1-(4-isobutyloxy-phenyl)-3-{4-[2-methyl-2-(2-pyridyl)-ethenyl] - phenyl}-2-thiourea with chloroacetone in ethanol according to the previously-described procedure.

The starting material may be prepared as follows: A mixture of 10.4 g. of 4-isobutyloxy-phenylisothiocyanate and 10.5 g. of 4-[2-methyl-2-(2-pyridyl)-ethenyl]-aniline in 75 ml. of ethanol is refluxed for three hours. Crystals are formed upon chilling and adding isopropanol; the 1-(4-isobutyloxy-phenyl)-3-{4-[2-methyl-2 - (2 - pyridyl)-ethenyl]-phenyl}-2-thiourea is filtered off, washed with isopropanol and then with pentane and recrystallized from isopropanol, M.P. 113–114°; yield 11 g.

What is claimed is:

1. A member of the group consisting of 2-phenyl-imino-3-phenyl-4-lower alkyl-4-thiazoline, in which one of the phenyl radicals is substituted in the 4-position by a member of the group consisting of alkoxy having from 4 to 5 carbon atoms and N,N-di-lower alkyl-amino-lower alkoxy, and the other phenyl radical is substituted in the 4-position by the group of the formula Py—[C(R)=CH]n—, in which Py stands for a member of the group consisting of 2-pyridyl, 3-pyridyl and 4-pyridyl, R represents a member of the group consisting of hydrogen and lower alkyl, and n represents a whole number from 0 to 2, and therapeutically acceptable acid addition salts thereof.

2. 2-phenyl-imino-3-phenyl-4-methyl-4 - thiazoline, in which one of the phenyl radicals is substituted in the 4-position by alkoxy having from 4 to 5 carbon atoms and the other phenyl radical is substituted in the 4-position by 2-pyridyl.

3. 2-(4-isobutyloxy-phenyl)-imino-[4 - (2 - pyridyl)-phenyl]-4-methyl-4-thiazoline.

4. 2-[4-(2-pyridyl)-phenyl]-imino-3 - (4 - isobutyloxy-phenyl)-4-methyl-4-thiazoline.

5. 2-(4-isopentyloxy-phenyl)-imino-3-[4-(2 - pyridyl)-phenyl]-4-methyl-4-thiazoline.

6. 2-[4-(2-pyridyl)-phenyl]-imino-3-(4 - isopentyloxy-phenyl)-4-methyl-4-thiazoline.

7. 2-phenyl-imino-3-phenyl-4-methyl-4 - thiazoline, in which one of the phenyl radicals is substituted in the 4-position by alkoxy having from 4 to 5 carbon atoms and the other phenyl radical is substituted in the 4-position by 2-(2-pyridyl)-ethenyl.

8. 2-(4-isopentyloxy-phenyl)-imino-3-{4-[2 - (2 - pyridyl)-ethenyl]-phenyl}-4-methyl-4-thiazoline.

9. 2-{4-[2-(2-pyridyl)-ethenyl]-phenyl}-imino - 3 - (4-isopentyloxy-phenyl)-4-methyl-4-thiazoline.

10. 2(4-isobutyloxy-phenyl)-imino-3-{4-[2 - (2 - pyridyl)-ethenyl]-phenyl}-4-methyl-4-thiazoline.

11. 2-{4-[2-(2-pyridyl)-ethenyl]-phenyl}-imino-3 - (4-isobutyloxy-phenyl)-4-methyl-4-thiazoline.

No references cited.

UNITED STATES PATENT OFFICE
CERTIFICATION OF CORRECTION

Patent No. 2,949,461  August 16, 1960

Renat Herbert Mizzoni

It is hereby certified that error appears in the above numbered patent requiring correction and that the said Letters Patent should read as corrected below.

Column 2, line 26, for "P," read -- Py, --; column 4, line 31, for "-[2-pyridyl)-" read -- -[2-(2-pyridyl)- --; line 59, for "Example 5" read -- Example 4 --.

Signed and sealed this 6th day of June 1961.

(SEAL)
Attest:

ERNEST W. SWIDER
Attesting Officer

DAVID L. LADD
Commissioner of Patents